United States Patent
Clements

(10) Patent No.: US 6,343,935 B1
(45) Date of Patent: Feb. 5, 2002

(54) COMPUTERIZED INTERACTIVE EDUCATIONAL METHOD AND APPARATUS FOR TEACHING VOCABULARY

(75) Inventor: Jeanne Clements, Morris Plains, NJ (US)

(73) Assignee: Castle Hill Learning Company, LLC, Morris Plains, NJ (US)

( * ) Notice: Subject to any disclaimer, the term of this patent is extended or adjusted under 35 U.S.C. 154(b) by 0 days.

(21) Appl. No.: 09/516,540

(22) Filed: Mar. 1, 2000

(51) Int. Cl.[7] .............................................. G09B 19/00
(52) U.S. Cl. ........................ 434/156; 434/167; 434/178; 434/185; 434/323
(58) Field of Search ................................ 434/156, 157, 434/167, 178, 185, 323

(56) References Cited

U.S. PATENT DOCUMENTS

| | | | |
|---|---|---|---|
| 4,341,389 A | | 7/1982 | Dumont |
| 5,316,482 A | | 5/1994 | Bryson |
| 5,540,589 A | * | 7/1996 | Waters .................... 434/156 X |
| 5,645,280 A | | 7/1997 | Zelmer |
| 5,697,789 A | * | 12/1997 | Sameth et al. .......... 434/157 X |
| 5,820,386 A | | 10/1998 | Sheppard |
| 5,827,071 A | | 10/1998 | Sorensen |
| 5,885,083 A | * | 3/1999 | Ferrell .................... 434/156 X |
| 5,893,717 A | | 4/1999 | Kirsch |
| 5,971,850 A | | 10/1999 | Liverance |
| 5,978,648 A | | 11/1999 | George |
| 6,077,085 A | * | 6/2000 | Parry et al. ............. 434/322 X |

OTHER PUBLICATIONS

Directions for Word Nerd SAT Game, Castle Hill Learning Center, Morris Plains, New Jersey, Applicant believes that these instructions were packaged with the game as early as Sep. 1998 (12 pages).

"Higher SAT scores—guaranteed." (scholastic aptitude test; Smartek Software's WordSmart educational software) (Product Announcement), CD–ROM World, v9, n5, p28 (2), May 1994.*

* cited by examiner

Primary Examiner—Joe H. Cheng
Assistant Examiner—Chanda Harris
(74) Attorney, Agent, or Firm—Barry R. Lipsitz; Douglas M. McAllister

(57) ABSTRACT

A computer based interactive method and apparatus for teaching vocabulary words. In particular, a vocabulary game aimed at preparing children for the SAT. The invention is also applicable to other vocabulary words for children and adults of all ages and learning levels, as well as teaching subjects and concepts other than vocabulary. The vocabulary game comprises a synonym matching game which provides audio and visual reinforcement of words, their definitions, and dialogue that uses the word, and requires the user to physically interact (i.e. select words, approve word choices, and the like). Reinforcement of vocabulary words is enhanced through the use of various support materials, including support tests, index cards containing phrases using the vocabulary words, and mnemonic aids.

52 Claims, 12 Drawing Sheets

| FIG. 1A |
|---------|
| FIG. 1B |

I DON'T LIKE YOUR FRIENDS!

1. Next to this new friend of yours, you look like the archetype of the perfect kid! (AR keh taip—a model)

2. I hope this is one of your transient friends; the sooner you part company, the happier I'll be! (TRAN see ehnt—short lived)

3. Don't you think that new boyfriend of yours is just a little bit primitive? He left footprints on the sofa! (PRIH mih tiv—out of date, old fashioned)

FIG.9

COMPUTERIZED INTERACTIVE EDUCATIONAL METHOD AND APPARATUS FOR TEACHING VOCABULARY

BACKGROUND OF THE INVENTION

The present invention relates generally to an interactive method and apparatus for teaching vocabulary, and more specifically to a computer based interactive system for teaching vocabulary words commonly found on the Scholastic Aptitude Tests (SAT). Although the invention is described as a vocabulary teaching system, it will be obvious to those skilled in the art that this invention may be applied to teaching a variety of subjects or topics, such as spelling, grammar, history, geography, music, literature, language, and the like.

It is known that there are three basic types of learners, visual, auditory, and bodily kinesthetic. A visual learner is taught through the use of visual stimuli, such as reading and writing. An auditory learner is taught through the use of audio stimuli, such as the spoken word, music, or other sound. A bodily kinesthetic learner requires physical movement or bodily interaction to learn. In particular, research has shown that a learner, especially a child, will respond best where information, is this case vocabulary, is reinforced utilizing all three categories. In addition, learning is enhanced by attaching new meanings to old experiences (or creating macro structures), which research has shown to be one of the keys to moving information from short term memory to long term memory.

It is the object of the present invention to provide a method and apparatus for teaching vocabulary words which addresses the needs of all three types of learners, visual, auditory, and bodily kinesthetic, through the use of visual, audio, and physical stimuli. It is a further object of the invention to turn the dreary and tedious task of preparing for the SAT's into a fun and social experience which appeals to all kinds of learners and all kinds of personalities.

SUMMARY OF THE INVENTION

The invention relates to a computer based interactive system for teaching vocabulary words. Although the invention is described in connection with a vocabulary game aimed at preparing children for the SAT, the invention is applicable to other vocabulary words for children and adults of all ages and learning levels, as well as teaching subjects and concepts other than vocabulary. The game comprises a synonym matching game which provides audio and visual reinforcement of words and their definitions, and requires the user to physically interact (i.e. select words, approve word choices, and the like).

In a particular embodiment of the game, a database containing words and an associated definition for each word is provided in a computer based environment, whether on a compact disk, floppy disk, hard drive or the internet. A visual display, such as on a computer monitor, television screen, or other video appliance, which includes at least one word set containing pairs of synonyms is provided such that a user can choose words through the use of a selection device, such as a keyboard, a mouse, or a touch screen display. The word set may be displayed in the form of a grid. In response to a first word choice by a user, the first word chosen is displayed together with its associated word definition. Audio in the form of a voice is provided for pronouncing the first word chosen by the user and reading its definition at the time of the word selection. The first word is then stored in memory. The user then attempts to match the first word with a word which is a synonym for the first word by choosing a second word from the word set. The second word choice is displayed with the associated word definition and an audio voice pronounces the second word and reads its definition at the time of the word selection. This second word is stored and compared with the first word to determine if the words are synonyms. The matching continues until a user finds the correct matching synonym for all words in the word set.

In another embodiment of the invention, a dialogue using the first word choice is displayed with the first word definition and a dialogue using the second word is displayed with the second word definition. As the invention is described in connection with a vocabulary game for children, the dialogue provided is "kid friendly" and suggests situations which may arise between a child and an adult, such as a parent, teacher, or guardian. In this way, learning is enhanced by attaching new meaning to old experiences.

In a further embodiment of the invention, audio is provided in the form of a voice for reading the dialogue after the dialogue is displayed. The audio voice which pronounces the word and reads its definition may be the same as the voice which reads the dialogue or may be a different voice. In one embodiment, the audio voice which pronounces the word choices and reads the definitions is in the form of a first voice, and the audio voice which reads the dialogue is in the form of a second voice. The first voice may comprise an adult-like voice and the second voice may comprise a child-like voice.

The game may also include a selection device for the user to approve or reject the first word choice. If the user rejects the first word choice, the word is returned to the word set and the user is allowed to make a different first word choice. The user then selects a second word choice. A correct choice of synonyms results in a first graphic appearing on the visual display and a compliment directed at the user. The word choices then disappear from the word grid to reveal a portion of a larger picture hidden beneath the word grid and a score for that player is recorded reflecting the correctly matched synonym pair. The user is then allowed to make additional word choices. An incorrect choice results in a second graphic appearing on the visual display and an insult directed at the user. The word choices then return to the word grid. This word selection and comparison process is repeated until all words are matched such that the hidden picture is completely revealed. The user may then return to a main start screen to choose a different word set.

The compliment may comprise a written, graphic, or audio compliment and the insult may comprise a written, graphic, or audio insult. In addition, the first graphic may comprise an animation and the second graphic may comprise an animation.

In addition, the hidden picture beneath the word grid may be animated once the hidden picture is revealed as an indicator that the user has successfully matched all synonyms.

In another embodiment, index cards are provided which contain written dialogue which communicates common messages from adults to children utilizing a word from the word sets, for use by adults in conversation with children to reinforce vocabulary retention through repetition.

The word set may contain an even number of words arranged in a grid with an odd number of pairs of synonyms and at least one pair of wild card words which are not synonyms. Alternatively, each word set may contain multiple word pairs of synonyms arranged in a grid and at least two wild card words which are not synonyms. The word sets may be comprised of words appearing on a Scholastic Aptitude Test.

The game may further include printable support tests, which contain, for example, vocabulary matching tests, sample SAT vocabulary questions, or the like. Alternatively, the support tests may be provided as part of an online internet-based tutorial. The printable support tests enable users to keep track of their progress and provide valuable advice on how to succeed on the SAT.

In a further embodiment, the invention may include a mnemonic aid wherein each word from the word set, together with its definition and an associated mnemonic aid are displayed one at a time and audio in the form of a voice reads each word, its definition, and an associated mnemonic aid as they are displayed.

The mnemonic aid may also be in the form of a matching game where each word is displayed in a grid on a first section of a display and each mnemonic aid is displayed in a grid on a second section of the display. Alternatively, each definition can be displayed on the grid on the second section of the display, with the mnemonic being provided in a separate pop-up window. The user then attempts to match the word with its associated mnemonic aid. Incorrect matching results in a graphic display and insult and correct matching results in a graphic display and compliment. In a particular embodiment, correct responses are reinforced by displaying the word definition again. The compliment may comprise a written, graphic or audio compliment and the insult may comprise a written, graphic or audio insult. The mnemonic aid may comprise a picture association aid, a word association aid, or a sound association aid.

The game may be played by a single user or multiple users making word choices in turn in an attempt to match synonyms, including a format for one, two, three, four or more players. Scoring for each user is independently recorded.

BRIEF DESCRIPTION OF THE DRAWINGS

FIG. 9 shows an example of an index card containing a word choice, its definition, and supporting dialogue;

DETAILED DESCRIPTION OF THE INVENTION

The invention relates to a computer based interactive method and apparatus for teaching vocabulary words. Although the invention is described in connection with a vocabulary game aimed at preparing children for the SAT, the invention is applicable to other vocabulary words for children and adults of all ages and learning levels, as well as teaching subjects and concepts other than vocabulary. The vocabulary game comprises a synonym matching game which provides audio and visual reinforcement of words and their definitions, and requires the user to physically interact (i.e. select words, approve word choices, and the like).

Figures 1, 1A:
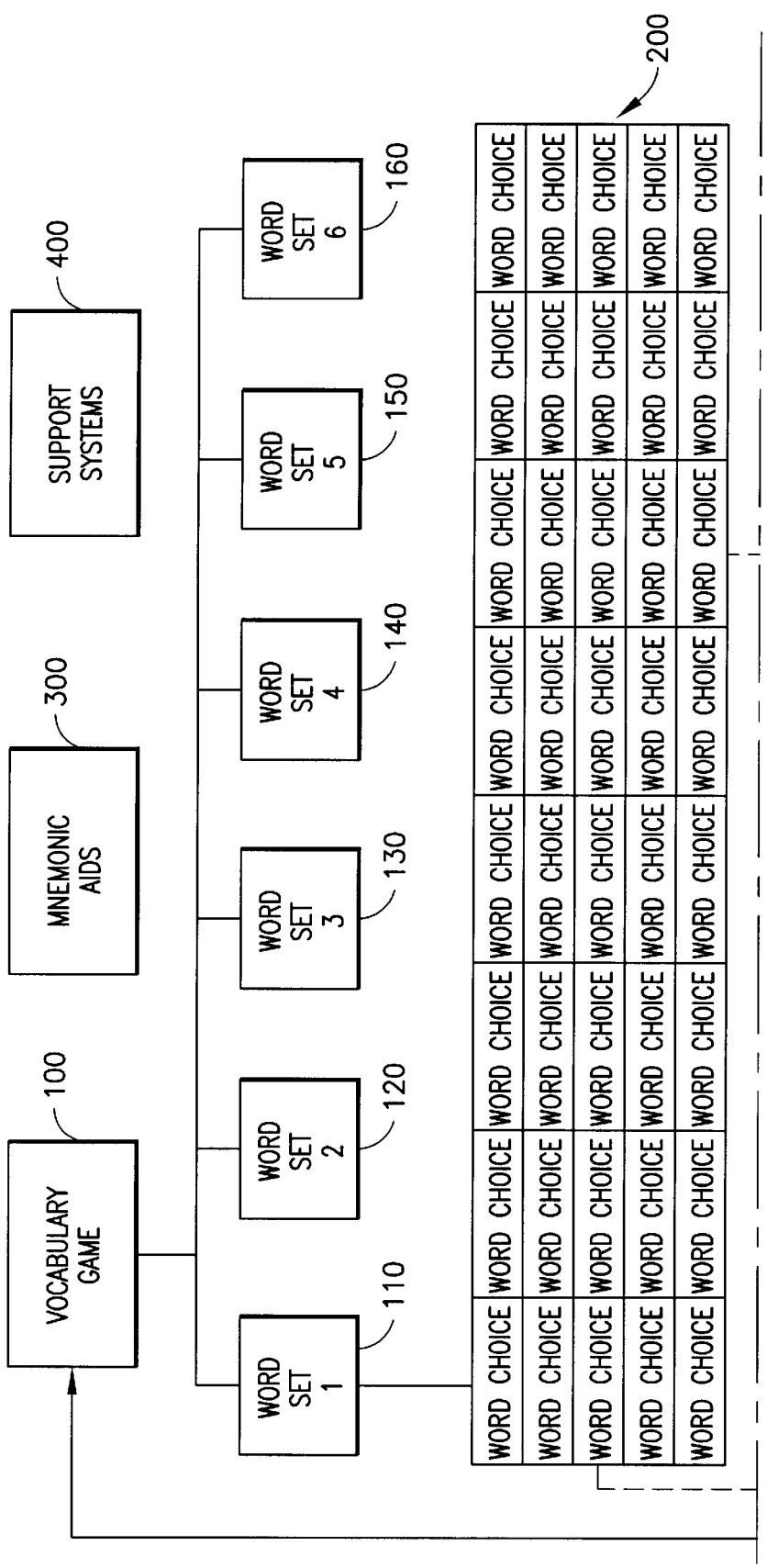
FIG. 1 shows a block diagram representation of the invention.
Figure 1B:
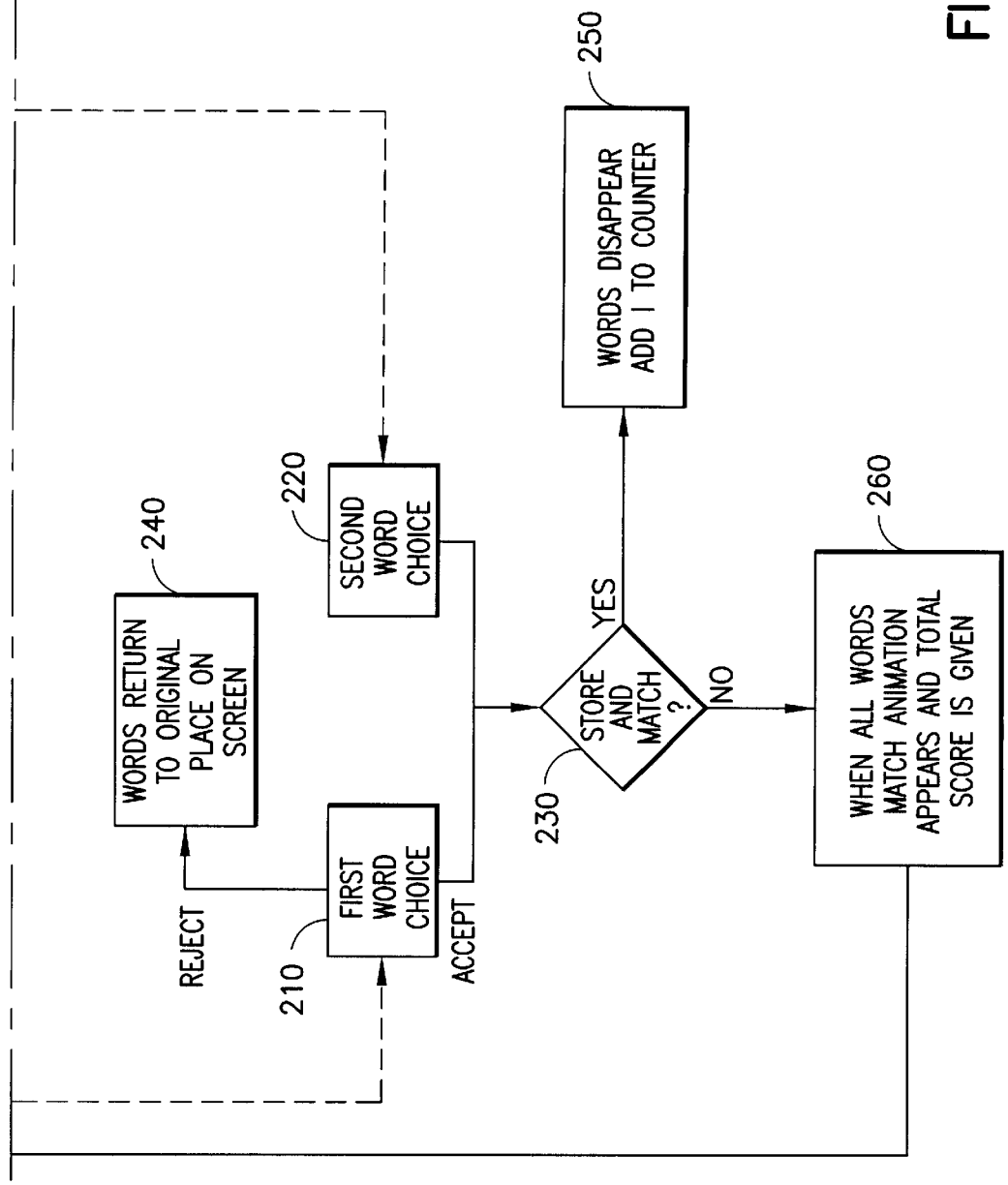

A simplified block diagram of the invention is shown in FIG. 1. A vocabulary game 100 is provided in a computer based environment, whether on a compact disk, floppy disk, hard drive or the internet. The vocabulary game 100 contains a database of one or more word sets. In FIG. 1, the vocabulary game 100 is shown as containing a database with 6 word sets, including word set 110, 120, 130, 140, 150, and 160, although any number of word sets may be provided. A user selects a word set through the use of a selection device such as a keyboard, a mouse, a touch video screen, or the like. Upon selection, a word set 200 is displayed on a video screen, such as a computer monitor, television screen, or other video appliance. Each word set contains word pairs of synonyms for a user to choose from through the use of the selection device. The word set may be displayed in the form of a grid 200 as shown in FIG. 1. The grid 200 is shown containing 40 words, although any number of word pairs may be displayed. The user may select a word from the word set 200. In FIG. 1, a first word choice 210 selected by the user will appear on the video display with the word definition. If the user accepts the first word choice 210, the first word choice 210 will be stored in memory 230 for later comparison with a second word choice. If the user rejects the first word choice 210, the word choice will be returned to its original location in the word grid 200 (represented by box 240). If the user rejects the first word choice 210, the user can then select another word choice from the word grid 200. The user then attempts to find the synonym match for the first word choice 210 by selecting a second word choice 220 from the word grid 200. Upon selection of the second word choice 220, the second word choice 220 and its definition will be displayed on the video display. The second word choice 220 will be stored and compared with the first word choice 210 to determine if the words are synonyms (box 230).

If the first word choice 210 and the second word choice 220 are synonyms, the words will disappear from the word grid 200 and a 1 is added to a counter 250 which functions as a scorer. The user then selects another first word choice 210 and the matching process is repeated. Once all the synonym pairs in word grid 200 have been correctly matched, a graphic or animation 260 will appear indicating successful completion of the synonym matching.

The user may then be allowed to exit the game, choose another word set, or access mnemonic aids 300 or support materials 400. The mnemonic aids 300 and support materials 400 will be described in detail in connection with preferred embodiments of the invention.

Figure 2:
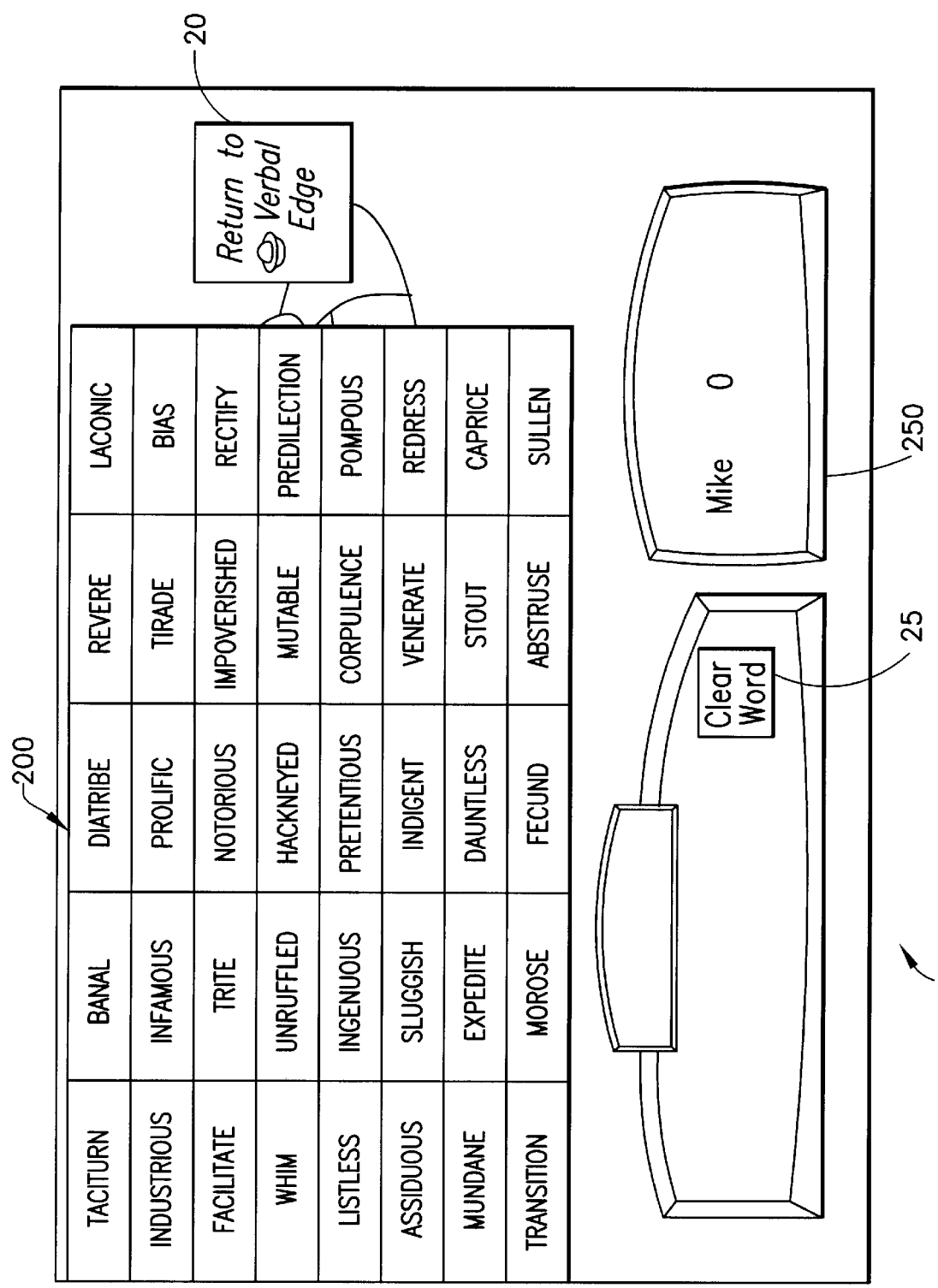
FIG. 2 shows the visual display with a word set displayed.
Figure 3:
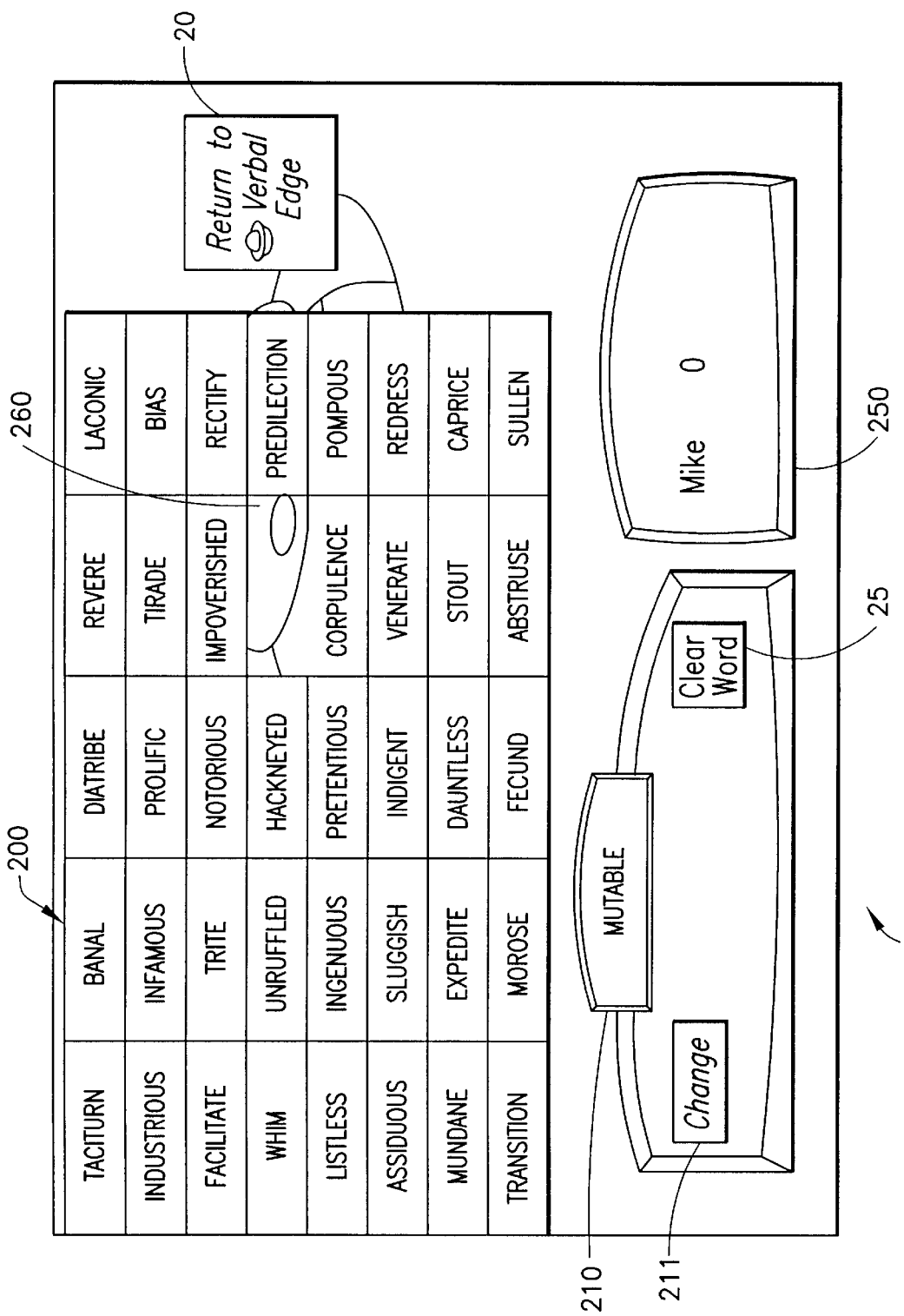
FIG. 3 shows the visual display with a word choice selected.
Figure 4:
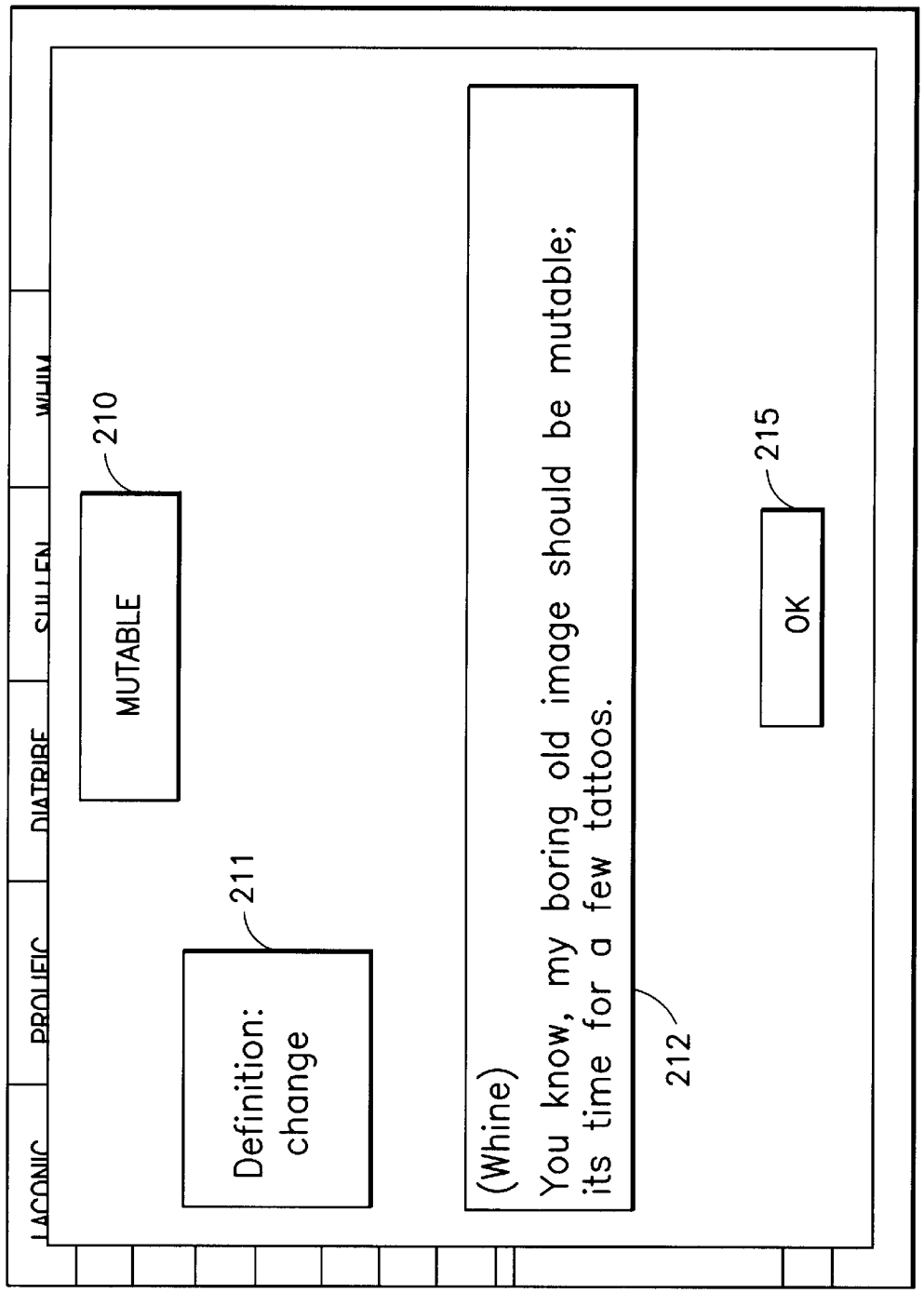
FIG. 4 shows a word choice with its definition and dialogue.

FIG. 2 shows a picture of the video display 10 with a word set displayed in a grid 200. The grid 200 is shown containing 40 words which contain pairs of synonyms. In one embodiment as shown in FIG. 3, a user can select a first word choice 210 from the word grid 200. In the example shown in FIG. 3, the user has selected a first word choice 210. In this example, the user has chosen the word "MUTABLE". As shown in FIG. 4, when the word "MUTABLE" is chosen by a user, the word 210, the word definition 211, and a dialogue 212 using the word 210 is displayed. As shown in FIG. 3, for the first word choice 210 "MUTABLE," the definition 211 "change" is displayed, together with a dialogue 212 "You know, my old boring image should be mutable; its time for a few tattoos." In one embodiment of the invention audio is provided for pronouncing the first word chosen by the user and reading its definition at the time of the word selection.

As shown in FIG. 4, the user accepts the first word choice (Box 215) and the word choice is stored. In the example shown in FIG. 3, the first word choice 210 is shown at the bottom of display 10 with its definition 211. After the first word choice 210 is stored, the user may elect to clear the first word choice (Box 25). If a user clears a word choice, the word returns to the word grid 200.

Figure 5:
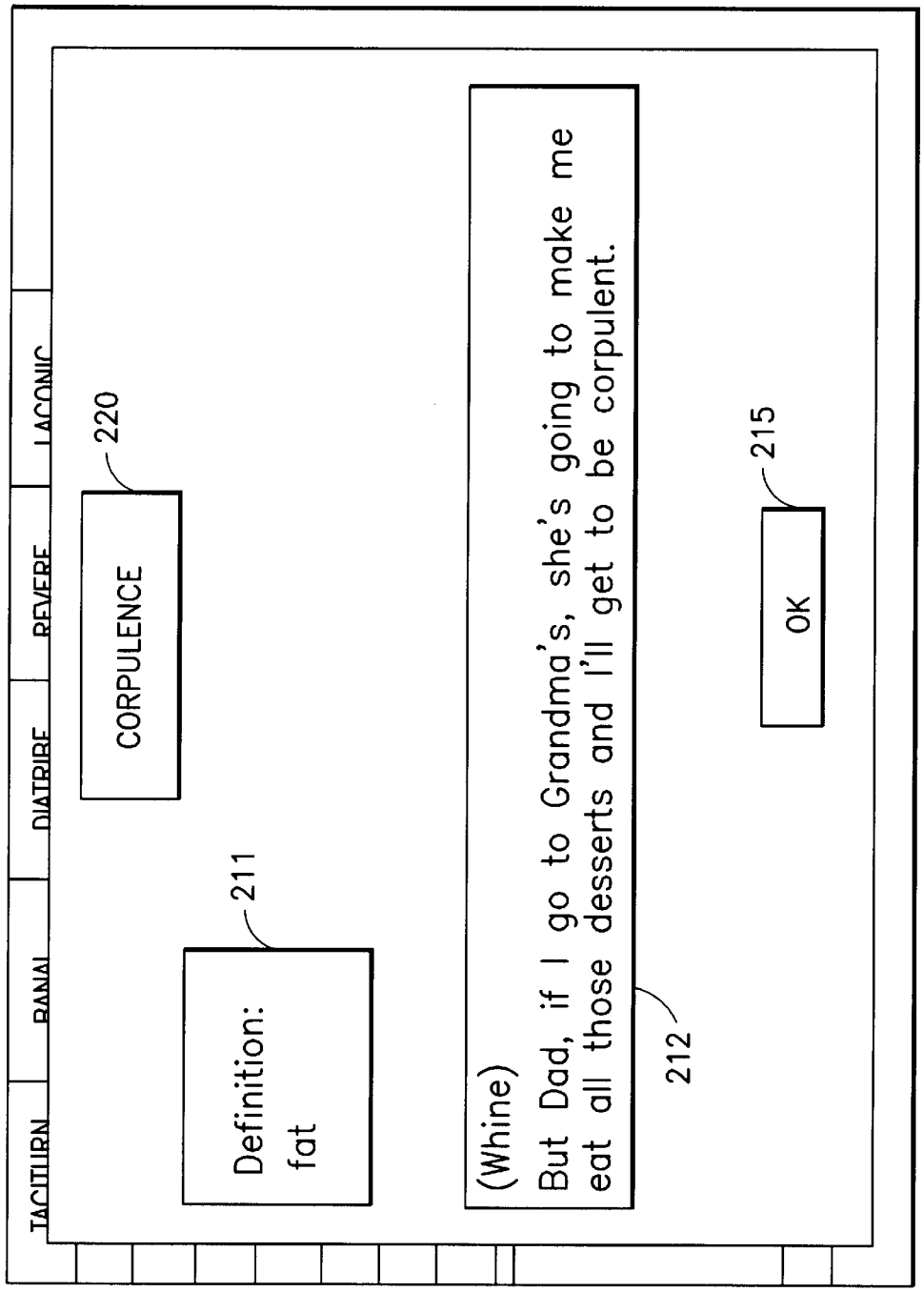
FIG. 5 shows a further word choice with its definition and dialogue.

After a first word choice 210 is accepted by the user, the user can then make a second word choice 220. Continuing this example, a second word choice 220 is shown in FIG. 5. In this example, the second word choice 220 is "CORPULENCE." Upon selection of the second word choice 220, the second word choice 220 will be displayed with its definition 211 and a dialogue 212 in the same manner as the first word choice 210 as shown in FIG. 4. Audio can be provided to pronounce the second word choice 220 and read the definition. The second word choice 220 is stored and compared with the first word choice 210 to determine if the first word choice 210 and the second word choice 220 are synonyms. Audio may be provided to read the dialogue for each word chosen.

Figure 6:
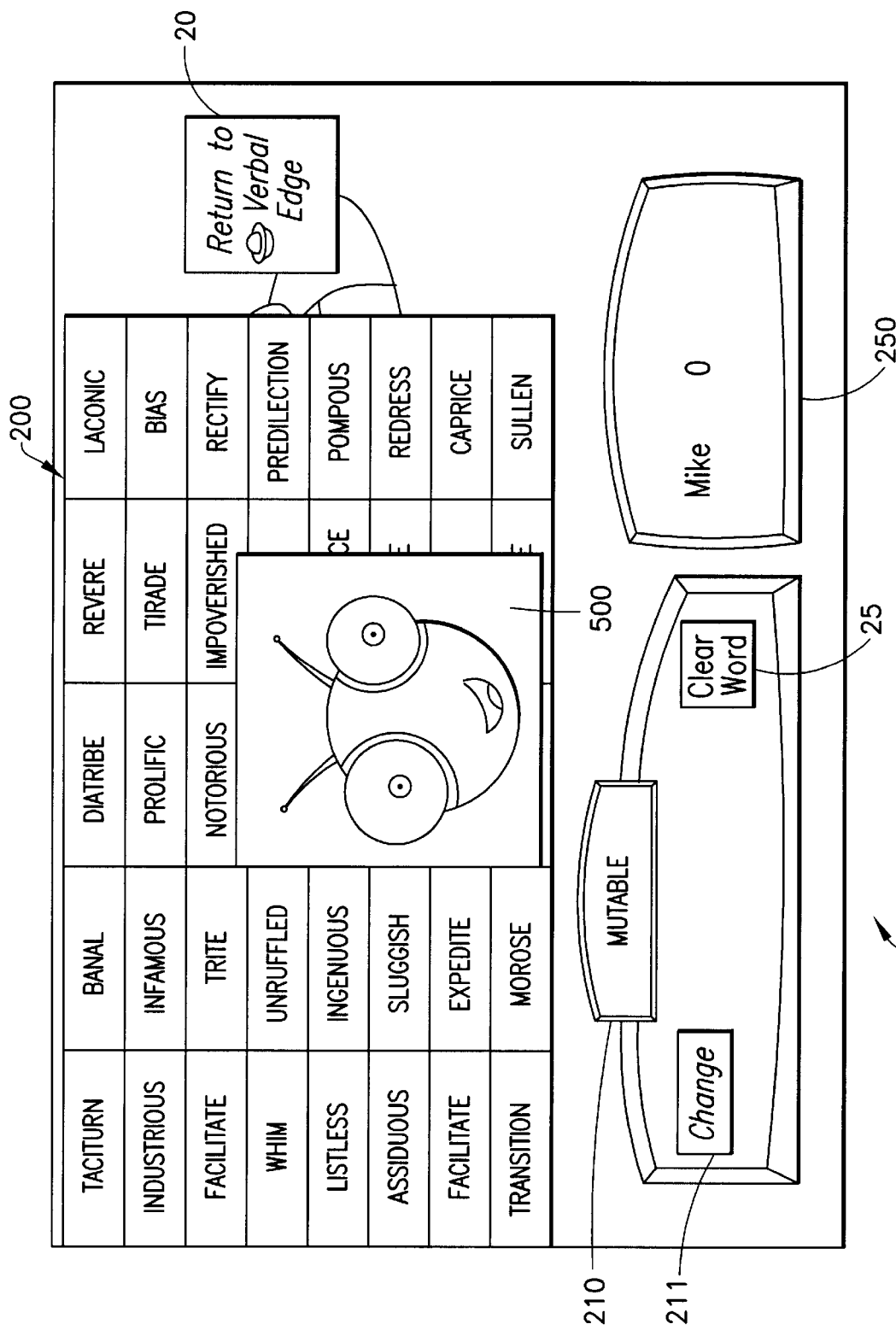
FIG. 6 shows the visual display indicating a correct word choice.

If the first word choice 210 and second word choice 220 are synonyms, a first graphic 500 will appear on the video display 10 as shown in FIG. 6 indicating a correct choice. In one embodiment, the graphic may comprise animation. In addition, a text compliment may be provided with the graphic. An audio voice may be provided to read the compliment. After the first graphic 500 appears, the word pair disappears from the word grid 200 and the user makes another attempt to match a synonym pair by repeating the above-described process.

Figure 7:
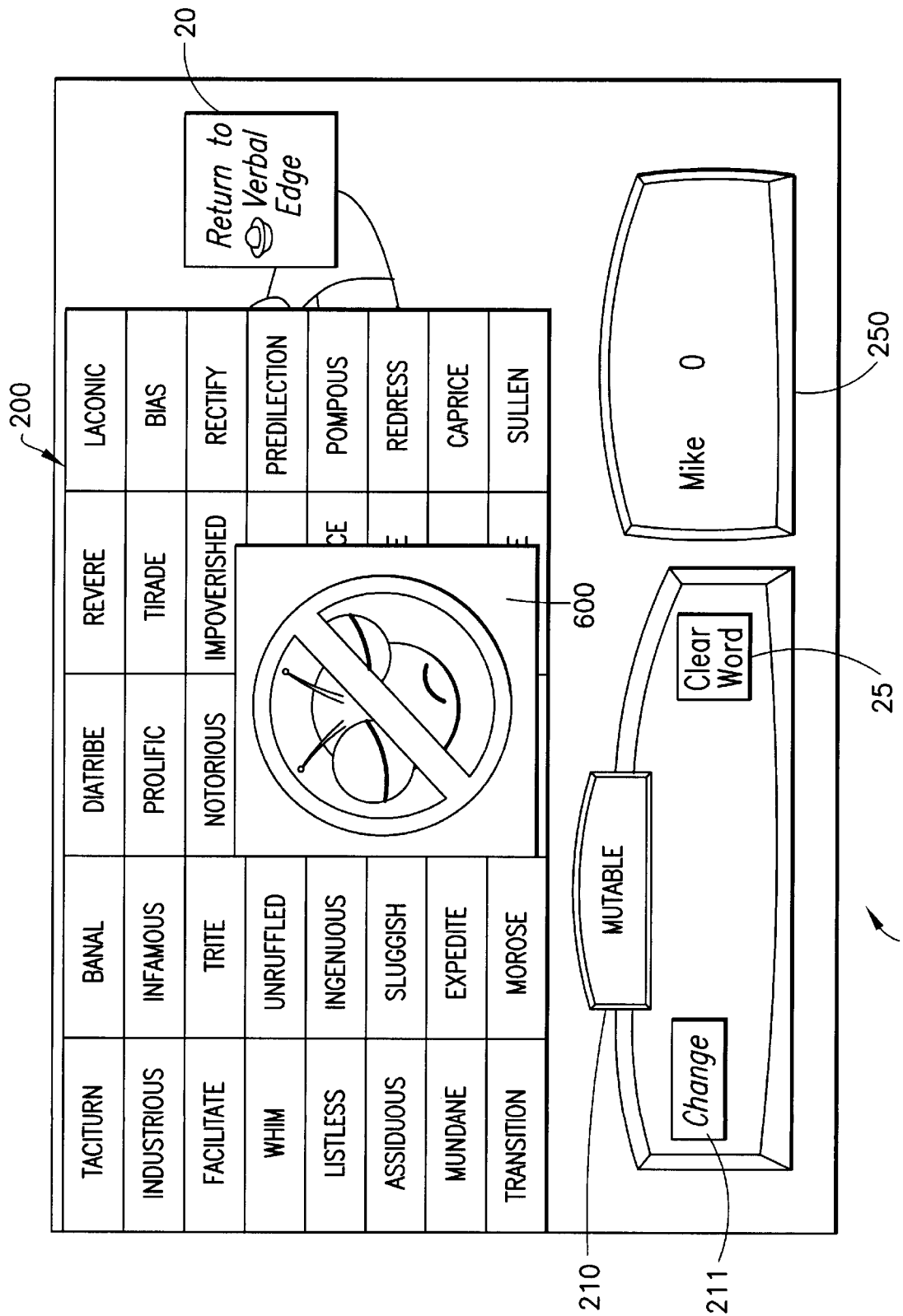
FIG. 7 shows the visual display indicating an incorrect word choice.

In the event the first word choice 210 and the second word choice 220 are not synonyms, a second graphic 600 as shown in FIG. 7 will appear indicating an incorrect word choice. Continuing the example from above, the second word choice 220 (CORPULENCE) shown in FIG. 5 is not a synonym match for the first word choice 210 (MUTABLE), which would result in the display of the graphic shown in FIG. 7. The graphic may include an insult directed at the user. The word choices will then return to their original places on the word grid 200. An audio voice may be provided to read the insult.

A selection box 20 (FIG. 2) may be provided to enable a user to return to a main start screen to select another word set, access mnemonic aids or support materials, or to exit the game.

The example shown in FIGS. 3–7 shows the vocabulary game as a one player game. However, the game can be configured for play by one player, two players, or more than two players. As shown in FIG. 2, scoring for each player is recorded as shown in Box 250. Each successful synonym match results in an incremental score increase for that user.

In addition, the first graphic 500 of FIG. 6 may comprise an animation and the second graphic 600 of FIG. 7 may comprise an animation.

Figure 8:
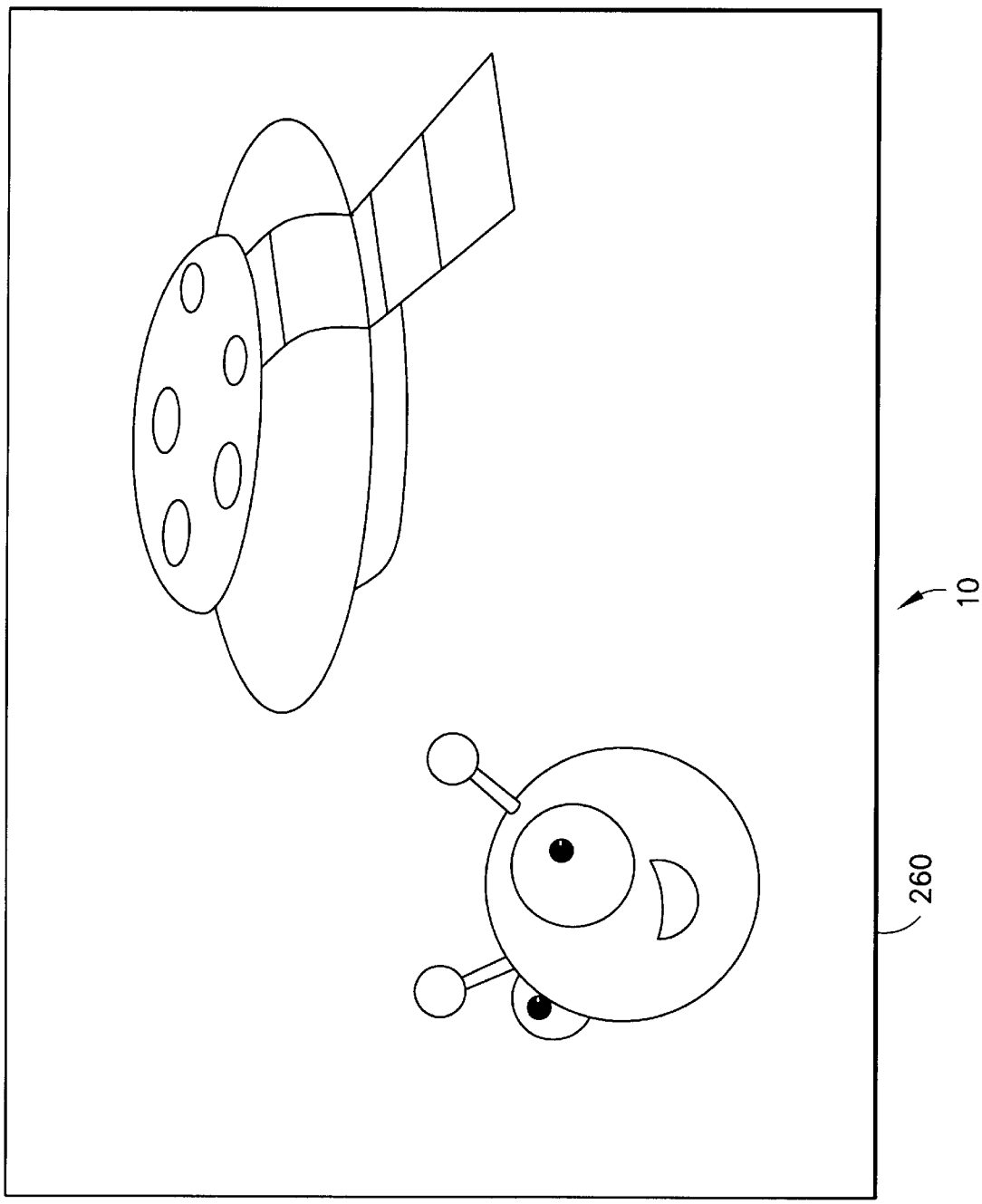
FIG. 8 shows a graphic which is hidden beneath a word grid.

In a preferred embodiment, a large picture 260 is hidden beneath the word grid 200 as shown in FIG. 8. As each word pair is matched and removed from the word grid 200, more of the picture 260 becomes revealed. FIG. 3 shows a portion of the picture 260 revealed.

Once all words are matched, the entire hidden picture 260 is revealed as shown in FIG. 8. In a particular embodiment, the hidden picture may become animated upon being revealed as an indicator of a successful matching of all synonyms.

In a further embodiment of the invention, audio is provided in the form of a voice for reading the dialogue 212 after the dialogue is displayed. The audio voice which pronounces the word and reads its definition may be the same as the voice which reads the dialogue or may be a different voice. In one embodiment, the audio voice which pronounces the word choices and reads the definitions is in the form of a first voice, and the audio voice which reads the dialogue is in the form of a second voice. The first voice may comprise an adult-like voice and the second voice may comprise a child-like voice.

In another embodiment, index cards are provided which contain written dialogue which communicates common messages from adults to children utilizing a word from the word sets, for use by adults in conversation with children to reinforce vocabulary retention. A sample index card 700 is shown in FIG. 9. FIG. 9 shows a sample phrase 701 an adult may say to a child, "I DON'T LIKE YOUR FRIENDS". The index card 700 also provides alternate phrases 702, 703, 704, an adult may use to convey the same message to a child using, in this example, vocabulary words found on the SAT. Each phrase 702, 703, and 704 contains a vocabulary word, its pronunciation, and its definition. For example, phrase 702 "Next to this new friend of yours, you look like the archetype of the perfect kid!" The word "archetype" is shown in bold italics to designate it as the SAT word in the phrase. The pronunciation for "archetype" is provided, "AR keh taip" as is its definition "a model". The index cards are provided to reinforce designated vocabulary words through their use in everyday conversation.

The above examples showed the word set arranged in a grid. However, the word set may be displayed in any manner suitable to allow for matching of word pairs. The word set may contain an even number of words with an odd number of pairs of synonyms and at least one pair of wild card words which are not synonyms. Alternatively, each word set may contain multiple word pairs of synonyms and at least two wild card words which are not synonyms. The word sets may be comprised of words appearing on a Scholastic Aptitude Test.

The game may further include printable support tests, which contain for example, vocabulary matching tests, sample SAT vocabulary questions, or the like. Alternatively, the support tests may be provided as part of an online web-based tutorial.

In a further embodiment, the invention may include a mnemonic aid wherein each word from the word set, together with its definition and an associated mnemonic aid are displayed one at a time and audio in the form of a voice reads each word, its definition, and an associated mnemonic aid as they are displayed.

Figure 10:
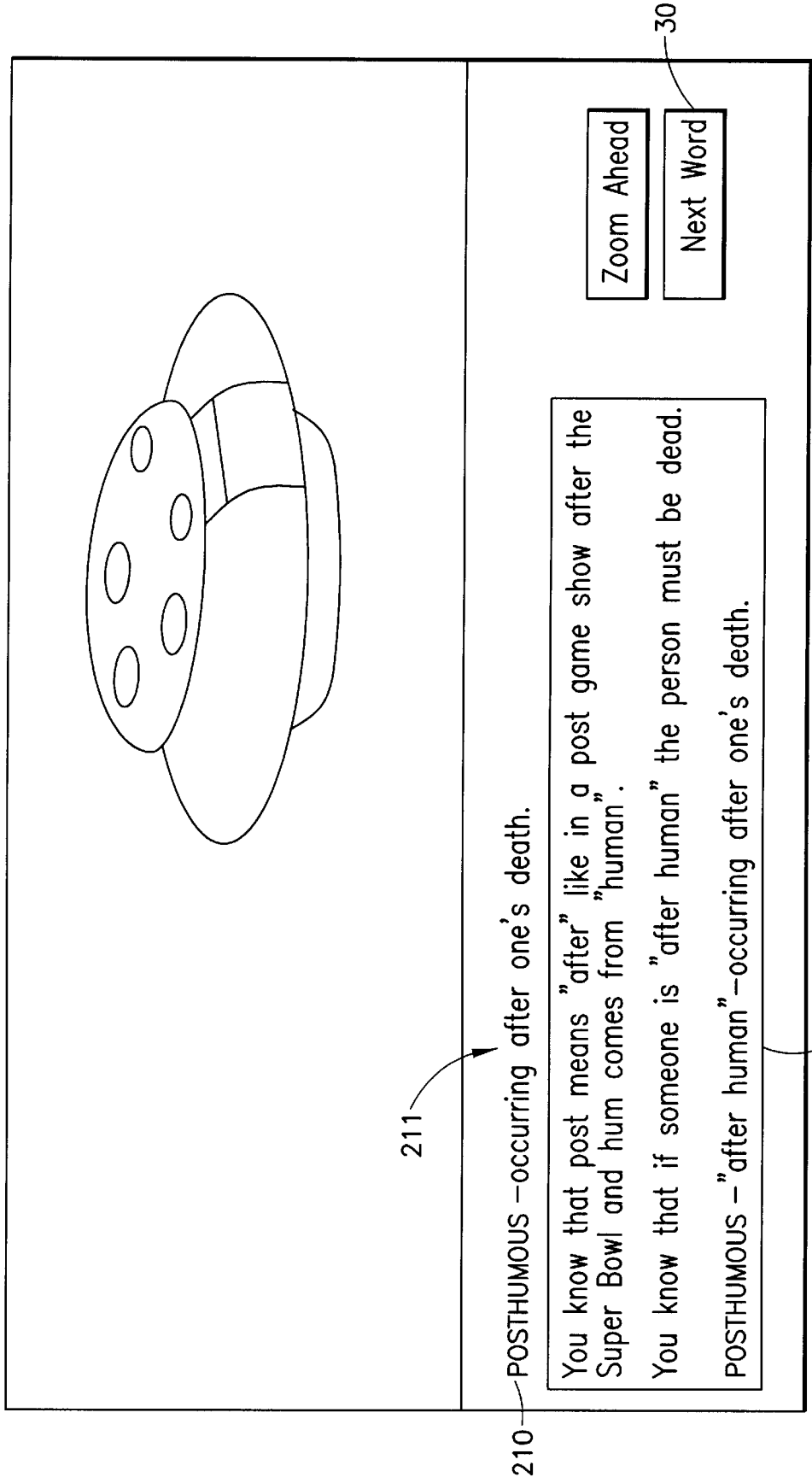
FIG. 10 shows the visual display with a word, its definition, and an associated mnemonic aid.

An example of such a mnemonic aid is displayed in FIG. 10. FIG. 10 shows a word 210 from the word set displayed with its definition 211. A mnemonic aid 280 is also displayed. In the example shown in FIG. 10, the word "POSTHUMOUS" is shown with its definition "occurring after one's death". A mnemonic aid 280 is provided "you know that post means 'after' like in a post game show after the Super Bowl, and that hum comes from 'human'. You know that if someone is 'after human' the person must be dead." A selection device 30 is provided for a user to advance to the next word in the word set.

Figure 11:
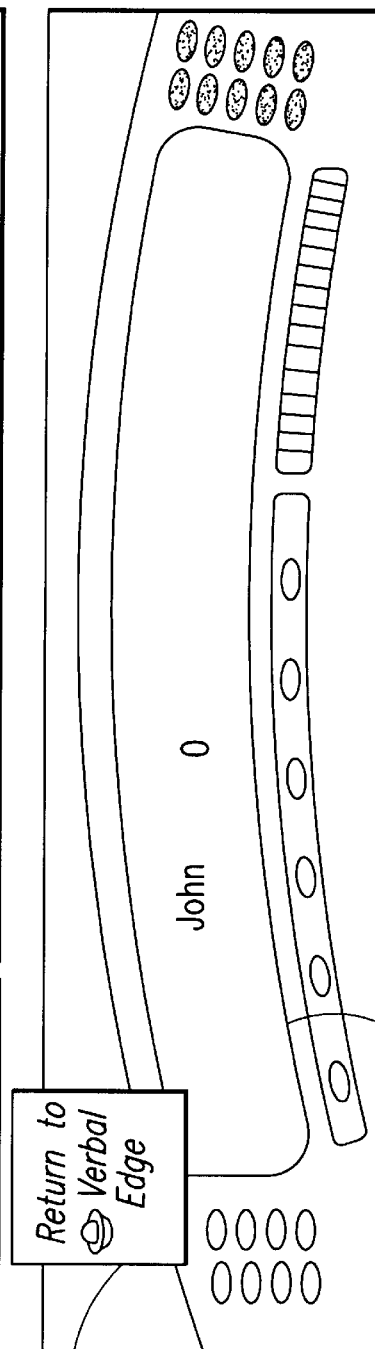
FIG. 11 shows the display with a word set and associated mnemonic aids.

In a further embodiment, the mnemonic aid may also be in the form of a matching game where each word is displayed in a grid on a first section of a display and each mnemonic aid is displayed in a grid on a second section of the display. For example, in FIG. 10 the user may review each word 210 from a word set, its associated definition 211 and its mnemonic aid 280. After review of all the words in the word set, each word from the word set is displayed in a grid 200, as shown in FIG. 11. Each mnemonic aid is also displayed in a corresponding grid 201. The user then attempts to match each word from the word grid 200 with its associated mnemonic aid from the grid of mnemonic aids 201. As described above in connection with the vocabulary matching, incorrect matching of a word and its mnemonic aid results in a graphic display and insult and correct matching results in a graphic display and compliment. In a particular embodiment, correct responses are reinforced by displaying the word definition 211 a second time. The compliment may comprise a written, graphic or audio compliment and the insult may comprise a written, graphic or audio insult. The mnemonic aid may comprise a picture association aid, a word association aid, or a sound association aid. Scoring is kept in the same manner as the vocabulary game described above (Box 250).

In an alternate embodiment, the definitions of the word set displayed in grid 200 are provided in the grid 201, instead of the mnemonics. In this embodiment (not shown), a separate pop-up window is displayed to show the mnemonic upon a correct match of a word from grid 200 and the corresponding definition from grid 201.

It will now be appreciated that the present invention provides an improved method for teaching vocabulary words through the use of a synonym matching game which provides a combination of audio, visual, and physical stimuli for enhanced learning, together with additional support materials such as mnemonic aids, support tests, and dialogue index cards for use by adults when speaking with children.

Although the invention has been described in connection with preferred embodiments thereof, those skilled in the art will appreciate that numerous adaptations and modifications may be made thereto without departing from the spirit and scope of the invention, as set forth in the following claims.

What is claimed:

1. An interactive computerized educational method for teaching vocabulary words to a user, comprising the steps of:
    providing a database containing words and an associated definition for each word;
    providing a visual display which includes at least one word set containing pairs of synonyms;
    providing an input device for user selection;
    displaying the word set on the visual display;
    displaying a first user chosen word from the word set and an associated word definition;
    providing an audio voice for pronouncing the first user chosen word and reading its definition;
    storing the first user chosen word;
    displaying a second user chosen word and an associated word definition;
    providing an audio voice for pronouncing the second user chosen word and reading its definition;
    storing the second user chosen word; and
    comparing the two word choices to determine if the words are synonyms.
2. A method in accordance with claim 1, comprising the further steps of:
    displaying a dialogue using the first user chosen word; and
    displaying a dialogue using the second user chosen word.
3. A method in accordance with claim 2, comprising the further step of:
    providing an audio voice for reading the dialogue after the dialogue is displayed.
4. A method in accordance with claim 3, wherein:
    the audio voice which pronounces the word choices and reads the definitions is in the form of a first voice; and
    the audio voice which reads the dialogue is in the form of a second voice.
5. A method in accordance with claim 4, wherein the first voice comprises an adult-like voice and the second voice comprises a child-like voice.
6. A method in accordance with claim 1, comprising the further steps of:
    displaying the word set in the form of a grid;
    providing a selection device for user approval or rejection of the first user chosen word, wherein
        the first user chosen word is returned to the word set if the first user chosen word is rejected, in which case a new first word choice is permitted, and
        the first user chosen word is compared with a second user chosen word to determine whether the words are synonyms if the first user chosen word is accepted, such that a correct choice of synonyms results in:
            a first graphic appearing on the visual display;
            a compliment directed at the user who correctly made a synonym match;
            the word choices disappearing from the word grid to reveal a portion of a larger picture hidden beneath the grid of word choices;
            a score is recorded reflecting the correctly matched synonym pair; and
            the user who correctly made a synonym match is allowed to make additional word choices;
        and such that an incorrect choice results in:
            a second graphic appearing on the visual display;
            an insult directed at the user who made the incorrect choice; and
            the word choices returning to the word grid; and
    repeating the word selection and comparison process until all words are matched such that the hidden picture is completely revealed.
7. A method in accordance with claim 6, wherein:
    the compliment comprises an audio compliment; and
    the insult comprises an audio insult.
8. A method in accordance with claim 6, wherein:
    the first graphic comprises an animation; and
    the second graphic comprises an animation.
9. A method in accordance with claim 6, comprising the further step of animating the hidden picture once the hidden picture is revealed as an indicator that all synonyms have been successfully matched.
10. A method in accordance with claim 1, comprising the further step of providing a selection device for returning to a main start screen to enable a user to choose a different word set.
11. A method in accordance with claim 1, comprising the further step of providing index cards containing written dialogue which communicates common messages from adults to children utilizing a word from the word sets, for use by adults in conversation with children to reinforce vocabulary retention.

12. A method in accordance with claim 1, wherein each word set contains an even number of words arranged in a grid with an odd number of pairs of synonyms and at least one pair of wild card words which are not synonyms.

13. A method in accordance with claim 1, wherein the word sets are comprised of words appearing on a Scholastic Aptitude Test.

14. A method in accordance with claim 13, comprising the further step of printing a support test containing sample Scholastic Aptitude Test questions.

15. A method in accordance with claim 14, comprising the further step of providing index cards containing written dialogue which communicates common messages from adults to children utilizing a word from the word sets, for use by adults in conversation with children to reinforce vocabulary retention.

16. A method in accordance with claim 1, comprising the further step of providing a mnemonic aid wherein:
   each word from the word set, together with its definition and an associated mnemonic aid are displayed one at a time; and
   audio in the form of a voice reads each word, its definition, and an associated mnemonic aid as they are displayed.

17. A method in accordance with claim 16, wherein the mnemonic aid is a matching game comprising the further steps of;
   displaying each word in a grid on a first section of a display;
   displaying either definitions or mnemonic aids for each word in a grid on a second section of the display; and
   providing a selection device to enable a user to match the word with its associated definition or mnemonic aid, wherein incorrect matching results in a graphic display and insult and correct matching results in a graphic display and compliment.

18. A method in accordance with claim 17, wherein:
   the compliment comprises an audio compliment; and
   the insult comprises an audio insult.

19. A method in accordance with claim 17, wherein the mnemonic aid comprises at least one of a picture association aid, a word association aid, or a sound association aid provided when a word is correctly matched to its definition.

20. A method in accordance with claim 17, wherein the mnemonic device comprises each of a picture association aid, a word association aid, and a sound association aid provided when a word is correctly matched to its definition.

21. A method in accordance with claim 1, wherein:
   a first user and a second user in turn select word choices in an attempt to match synonyms; and
   scoring for each user is independently recorded.

22. A method in accordance with claim 21, wherein the word sets are comprised of words appearing on a Scholastic Aptitude Test.

23. A method in accordance with claim 22, comprising the further step of providing index cards containing written dialogue which communicates common messages from adults to children utilizing a word from the word sets, for use by adults in conversation with children to reinforce vocabulary retention.

24. A method in accordance with claim 22, comprising the further step of printing a support test containing sample Scholastic Aptitude Test questions.

25. A method in accordance with claim 24, wherein the support test comprises an online test.

26. A method in accordance with claim 1, wherein each word set contains multiple word pairs of synonyms arranged in a grid and at least two wild card words which are not synonyms.

27. A method in accordance with claim 1, wherein:
   multiple users in turn select word choices in an attempt to match synonyms; and
   scoring for each user is independently recorded.

28. An interactive computerized educational apparatus for teaching vocabulary words to a user, comprising:
   a database containing words and an associated definition for each word;
   a visual display which includes at least one word set containing pairs of synonyms;
   an input device for user selection;
   a visual display adapted to display the word set;
      said visual display being adapted to display a first user chosen word from the word set and an associated word definition;
   an audio processor for providing a voice for pronouncing the first user chosen word and reading its definition;
   memory for storing the first user chosen word from the word set;
      said visual display being adapted to display a second user chosen word and an associated word definition;
      said audio processor providing a voice for pronouncing the second user chosen word and reading its definition;
   memory for storing the second user chosen word; and
   a comparator for comparing the two word choices to determine if the words are synonyms.

29. An apparatus in accordance with claim 28, wherein:
   said visual display is adapted to display a dialogue using the first user chosen word and to display a dialogue using the second user chosen word.

30. An apparatus in accordance with claim 29, wherein:
   said audio processor provides an audio voice for reading the dialogue after the dialogue is displayed.

31. An apparatus in accordance with claim 30, wherein:
   the audio voice which pronounces the word choices and reads the definitions is in the form of a first voice; and
   the audio voice which reads the dialogue is in the form of a second voice.

32. An apparatus in accordance with claim 31, wherein the first voice comprises an adult-like voice and the second voice comprises a child-like voice.

33. An apparatus in accordance with claim 28, wherein said visual display is adapted to display the word set in the form of a grid, said apparatus further comprising;
   a selection device for approval or rejection of the first user chosen word, wherein
      the first user chosen word is returned to the word set if the first user chosen word is rejected, in which case new word choices are permitted, and p2 the first user chosen word is compared with a second user chosen word to determine whether the words are synonyms if the first user chosen word is accepted, such that a correct choice of synonyms results in:
      a first graphic appearing on the visual display;
      a compliment directed at the user who correctly made a synonym match;
      the word choices disappearing from the word grid to reveal a portion of a larger picture hidden beneath the grid of word choices;
      a score is recorded reflecting the correctly matched synonym pair; and
      the user who correctly made a synonym match is allowed to make additional word choices;

and such that an incorrect choice results in:
- a second graphic appearing on the visual display;
- an insult directed at the user who made the incorrect choice; and
- the word choices returning to the word grid; and a visual display adapted to reveal the hidden picture when all words are matched.

34. An apparatus in accordance with claim 33, wherein:
the compliment comprises an audio compliment; and
the insult comprises an audio insult.

35. An apparatus in accordance with claim 33, wherein:
the first graphic comprises an animation; and
the second graphic comprises an animation.

36. An apparatus in accordance with claim 33, wherein said visual display is adapted to provide animation of the hidden picture once the hidden picture is revealed as an indicator that all synonyms have been successfully matched.

37. An apparatus in accordance with claim 28, further comprising a selection device for returning to a main start screen to enable a user to choose a different word set.

38. An apparatus in accordance with claim 28, further comprising index cards containing written dialogue which communicates common messages from adults to children utilizing a word from the word sets, for use by adults in conversation with children to reinforce vocabulary retention.

39. An apparatus in accordance with claim 28, wherein each word set contains an even number of words arranged in a grid with an odd number of pairs of synonyms and at least one pair of wild card words which are not synonyms.

40. An apparatus in accordance with claim 28, wherein the word sets are comprised of words appearing on a Scholastic Aptitude Test.

41. An apparatus in accordance with claim 40, further comprising a printable support test containing sample Scholastic Aptitude Test questions.

42. An apparatus in accordance with claim 28, further comprising a mnemonic aid wherein:
- said visual display is adapted to display each word from the word set, together with its definition and an associated mnemonic aid one at a time; and
- said audio processor provides a voice which reads each word, its definition, and an associated mnemonic aid as they are displayed.

43. An apparatus in accordance with claim 42, wherein:
the mnemonic aid is a matching game;
said visual display is adapted to display each word in a grid on a first section thereof and to display either definitions or mnemonic aids for each word in a grid on a second section thereof; and
a selection device is provided to enable a user to match each word with its associated definition or mnemonic aid, such that incorrect matching results in a graphic display and insult and correct matching results in a graphic display and compliment.

44. An apparatus in accordance with claim 43, wherein:
the compliment comprises an audio compliment; and
the insult comprises an audio insult.

45. An apparatus in accordance with claim 42, wherein the mnemonic aid comprises at least one of a picture association aid, a word association aid, or a sound association aid.

46. An apparatus in accordance with claim 42, wherein the mnemonic device comprises each of a picture association aid, a word association aid, and a sound association aid.

47. An apparatus in accordance with claim 28, wherein:
a first user and a second user in turn select word choices in an attempt to match synonyms; and
scoring for each user is independently recorded.

48. An apparatus in accordance with claim 47, wherein the word sets are comprised of words appearing on a Scholastic Aptitude Test.

49. An apparatus in accordance with claim 48, further comprising a printable support test containing sample Scholastic Aptitude Test questions.

50. An apparatus in accordance with claim 49, wherein the support test comprises an online test.

51. An apparatus in accordance with claim 28, wherein each word set contains multiple word pairs of synonyms arranged in a grid and at least two wild card words which are not synonyms.

52. An apparatus in accordance with claim 28, wherein:
multiple users in turn select word choices in an attempt to match synonyms; and
scoring for each user is independently recorded.

* * * * *